United States Patent
Kamma

(10) Patent No.: US 11,243,725 B2
(45) Date of Patent: Feb. 8, 2022

(54) NON-TRANSITORY COMPUTER-READABLE STORAGE MEDIUM STORING COMPUTER PROGRAM FOR TERMINAL DEVICE CONFIGURED TO CONNECT TO IMAGE PROCESSING DEVICES ON NETWORK, AND TERMINAL DEVICE

(71) Applicant: BROTHER KOGYO KABUSHIKI KAISHA, Nagoya (JP)

(72) Inventor: Yui Kamma, Kasugai (JP)

(73) Assignee: BROTHER KOGYO KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/689,210

(22) Filed: Nov. 20, 2019

(65) Prior Publication Data

US 2020/0169949 A1 May 28, 2020

(30) Foreign Application Priority Data

Nov. 27, 2018 (JP) .............................. JP2018-221052

(51) Int. Cl.
*G06F 3/12* (2006.01)
*H04N 1/00* (2006.01)
*H04N 1/32* (2006.01)
*H04W 48/16* (2009.01)
*H04W 48/10* (2009.01)

(52) U.S. Cl.
CPC .......... *G06F 3/1226* (2013.01); *G06F 3/1204* (2013.01); *H04N 1/0097* (2013.01); *H04N 1/00214* (2013.01); *H04N 1/00941* (2013.01); *H04N 1/00973* (2013.01);
(Continued)

(58) Field of Classification Search
None
See application file for complete search history.

(56) References Cited

U.S. PATENT DOCUMENTS

2002/0198989 A1* 12/2002 Kimura ............... H04L 41/0213
709/224
2006/0077455 A1* 4/2006 Watanabe ............. G06F 3/1236
358/1.15
(Continued)

FOREIGN PATENT DOCUMENTS

| JP | 2003-150348 A | 5/2003 |
| JP | 2012-038291 A | 2/2012 |
| JP | 2018-186395 A | 11/2018 |

*Primary Examiner* — Miya J Williams
(74) *Attorney, Agent, or Firm* — Scully, Scott, Murphy & Presser, P.C.

(57) ABSTRACT

A non-transitory computer-readable storage medium stores a program for a terminal device. The terminal device includes a storage, an operation unit, a display, and a controller. The program, when executed by the controller, causes the terminal device to perform, based on receiving an input from a user via the operation unit, sending a signal to image processing devices, including a particular image processing device, that are on the same network as the terminal device; receiving responses to the signal from the image processing devices; and based on receiving a response to the signal from the particular image processing device that is identified by device identification information stored in the storage, displaying, in the display, a device list listing device information of the particular image processing device in an emphasized manner.

8 Claims, 7 Drawing Sheets

(52) U.S. Cl.
CPC ........... *H04W 48/10* (2013.01); *H04W 48/16* (2013.01); *H04N 1/32069* (2013.01)

(56) References Cited

U.S. PATENT DOCUMENTS

| | | | |
|---|---|---|---|
| 2007/0030512 A1* | 2/2007 | Oka | G06F 3/1231 |
| | | | 358/1.15 |
| 2007/0124512 A1* | 5/2007 | Park | G06F 3/1288 |
| | | | 710/8 |
| 2007/0177192 A1* | 8/2007 | Wang | G06F 3/1288 |
| | | | 358/1.15 |
| 2008/0180726 A1* | 7/2008 | Selvaraj | G06F 3/1226 |
| | | | 358/1.15 |
| 2010/0070657 A1* | 3/2010 | Yoshida | G06F 3/1229 |
| | | | 710/10 |
| 2010/0250738 A1* | 9/2010 | Nagatani | H04L 41/0866 |
| | | | 709/224 |
| 2011/0317211 A1 | 12/2011 | Yamada et al. | |
| 2014/0036305 A1* | 2/2014 | Nakamura | H04N 1/00281 |
| | | | 358/1.15 |
| 2014/0189396 A1* | 7/2014 | Miyahara | G06F 1/325 |
| | | | 713/320 |
| 2016/0350036 A1* | 12/2016 | Shibata | G06F 3/126 |
| 2018/0063364 A1* | 3/2018 | Nagasawa | G06F 3/1204 |
| 2018/0316820 A1* | 11/2018 | Asai | H04N 1/32064 |

\* cited by examiner

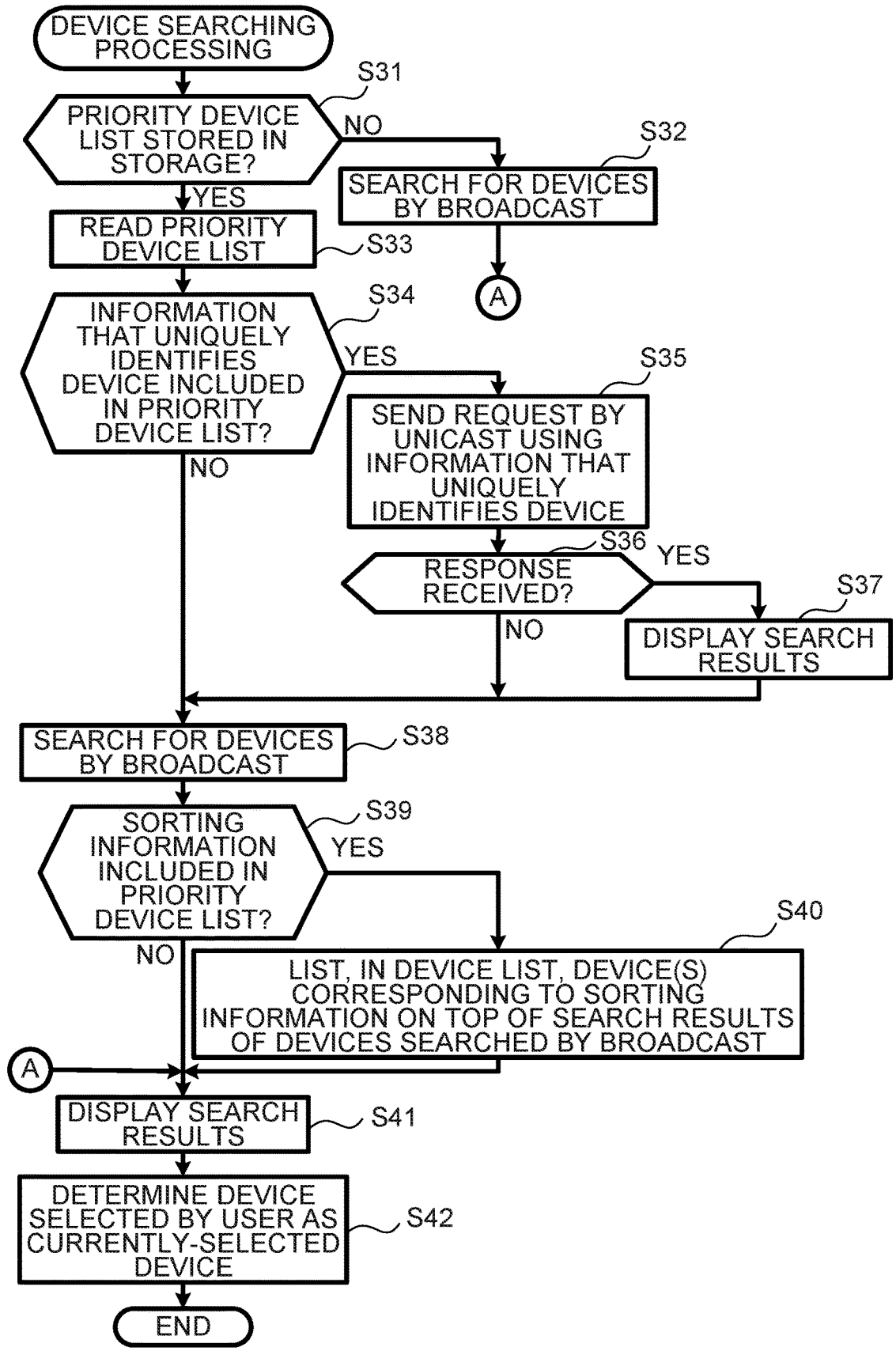

NON-TRANSITORY COMPUTER-READABLE STORAGE MEDIUM STORING COMPUTER PROGRAM FOR TERMINAL DEVICE CONFIGURED TO CONNECT TO IMAGE PROCESSING DEVICES ON NETWORK, AND TERMINAL DEVICE

CROSS-REFERENCE TO RELATED APPLICATION

This application claims priority from Japanese Patent Application No. 2018-221052 filed on Nov. 27, 2018, the content of which is incorporated herein by reference in its entirety.

TECHNICAL FIELD

Aspects of the disclosure relate to a technique of searching for a device that executes image processing.

BACKGROUND

A known data processing apparatus executes a print-and-scan application, thereby transmitting a scan request to a scanner connected to the data processing apparatus via a network, or a print request to a printer connected to the data processing apparatus via a network. The data processing apparatus sets a device as a default device for executing a particular function among a plurality of functions. To set a default device, the data processing apparatus searches for devices that are on the same network as the data processing apparatus, using a broadcast method. A user selects and sets one of the searched devices as a default device.

SUMMARY

If the number of devices on the network is greater when devices are searched, the number of devices listed in a device list is greater. It may be difficult for a user to find and select a desired device from the device list listing a greater number of searched devices.

Aspects of the disclosure provide a technique of arranging the order of a device list listing a plurality of devices, such that a device that a user is likely to select may be readily identified in the device list.

One aspect of the disclosure may provide a non-transitory computer-readable storage medium storing a program for a terminal device configured to connect to a network, and image processing devices, including a particular image processing device, that are on the network. The image processing devices each may have device identification information that uniquely identifies a respective one of the image processing devices. The terminal device may comprise a storage configured to store the device identification information of the particular image processing device, an operation unit configured to receive an input from a user of the terminal device, a display, and a controller. The program, when executed by the controller, may cause the terminal device to perform, based on receiving the input from the user via the operation unit, sending a signal to the image processing devices, including the particular image processing device, that are on the network; receiving responses to the signal from the image processing devices; and based on receiving a response to the signal from the particular image processing device that is identified by the device identification information stored in the storage, displaying, in the display, a device list listing device information of the particular image processing device in an emphasized manner.

Another aspect of the disclosure may provide a terminal device comprising a storage configured to store device identification information of a particular image processing device, an operation unit configured to receive an input from a user of the terminal device, a display, a network interface configured to connect the terminal device to a network, and to image processing devices, including the particular image processing device, that are on the network, the image processing devices, each having device identification information that uniquely identifies a respective one of the image processing devices; and a controller. The controller may be configured to receive the input from the user via the operation unit, send a signal to the image processing devices, including the particular image processing device, that are on the network, receive responses to the signal from the image processing devices, and based on receiving a response to the signal from the particular image processing device that is identified by the device identification information stored in the storage, display, in the display, a device list listing device information of the particular image processing device in an emphasized manner.

The technique disclosed in the specification may be implemented in a variety of forms, for example, with a terminal device that executes the program, an image processing system, an image processing method, or a recording medium having a computer program recorded therein for implementing functions of the device or the method.

According to one or more aspects of the disclosure, a particular device may be emphasized over the other devices in the device list displayed in the display. This may allow a user to readily select the particular device from the device list listing device information of a plurality of devices.

BRIEF DESCRIPTION OF THE DRAWINGS

FIG. 8 is a flowchart of device searching processing included in the main processing depicted in FIG. 3, in an illustrative embodiment according to aspects of the disclosure.

DETAILED DESCRIPTION

An illustrative embodiment will be described referring to FIGS. 1 through 8.

Figure 1:
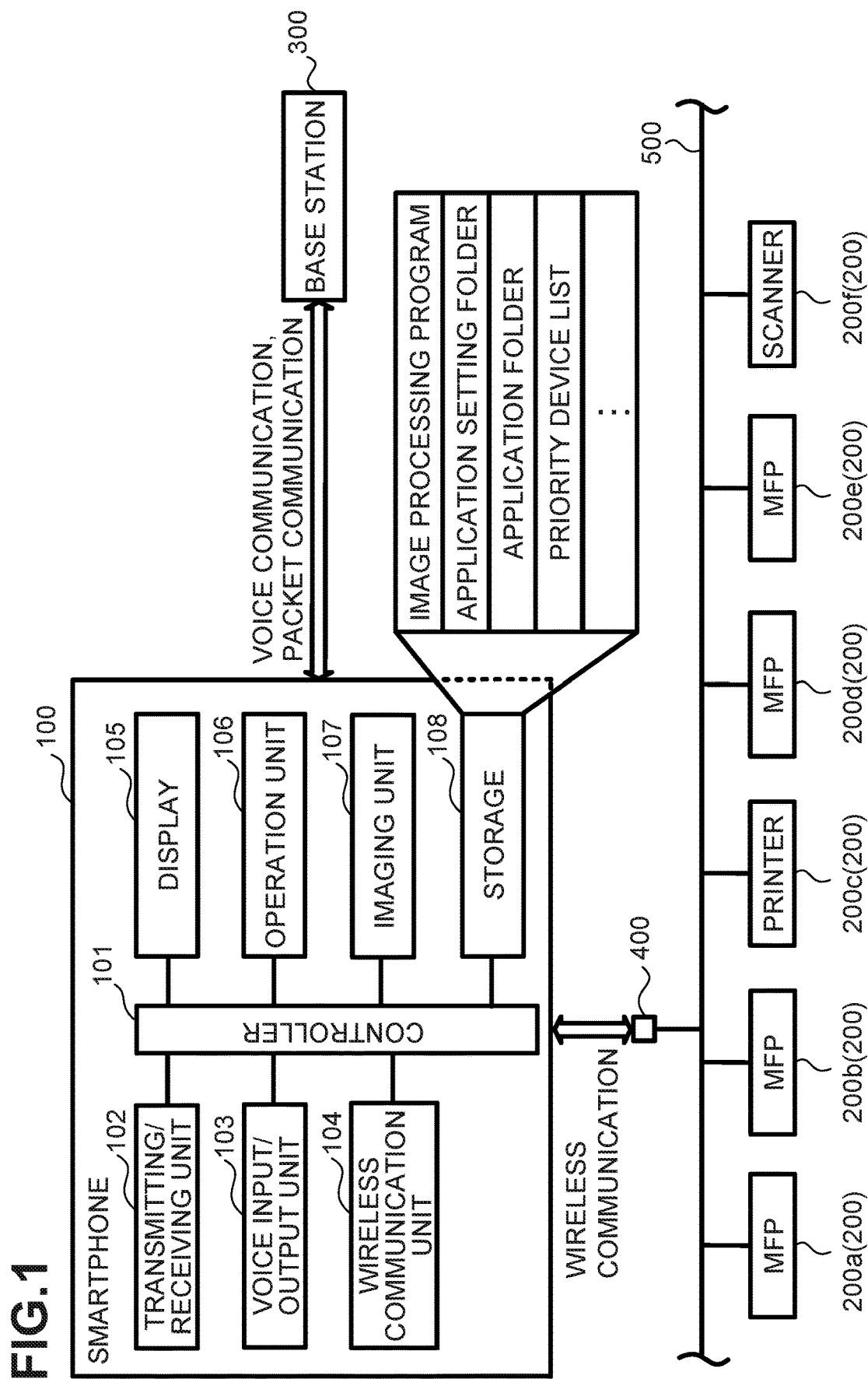
FIG. 1 illustrates a general configuration of a smartphone as an example of a terminal device in an illustrative embodiment according to aspects of the disclosure, the smartphone being connected to multiple devices via a communication network.

FIG. 1 schematically illustrates a smartphone 100 configured to execute programs, e.g., an image processing program, and devices 200 (e.g., 200a-200f) configured to communicatively connect to the smartphone 100. A set of instructions that perform a particular task may be herein referred to as a program. The smartphone 100 has a telephone function and a wireless communication function. The smartphone 100 is wirelessly connected to a communication network 500 via, for example, a wireless LAN router 400.

The devices 200 include multifunction peripherals (MFPs) 200a, 200b, 200d, and 200e, a printer 200c, and a scanner 200f. Each of the MFPs 200a, 200b, 200d, and 200e includes multiple functions, such as a printer function, a scanner function, and a facsimile function. The MFPs 200a, 200b, 200d, and 200e may be produced by different manufacturers, or may be different models produced by the same manufacturer. In the illustrative embodiment, the MFPs 200a and 200b are of the same model (e.g., model name "MFP-A"). The MFPs 200d and 200e are of different models from the MFPs 200a and 200b (e.g., "MFP-A"). The models of the MFPs 200d and 200e are different from each other.

The printer 200c is a single-function device having a printer function. The scanner 200f is a single-function device having a scanner function. The printer 200c and the scanner 200f may be produced by different manufacturers or by the same manufacturer.

In the following description, the "device 200" may be used to denote any one of these devices 200a-200f.

The smartphone 100 includes a controller 101, a transmitting/receiving unit 102, a voice input/output unit 103, a wireless communication unit 104, a display 105, an operation unit 106, an imaging unit 107, and a storage 108.

The controller 101 includes a central processing unit ("CPU"), a read only memory ("ROM"), and a random access memory ("RAM"). The CPU is configured to control components of the smartphone 100 by executing various programs stored in the ROM or the storage 108. The ROM stores various data and programs to be executed by the CPU. The RAM is used as a temporary storage device when the CPU executes various processing.

The transmitting/receiving unit 102 includes an antenna, a radio frequency (RF) circuit, and a baseband processor. The transmitting/receiving unit 102 is configured to transmit/receive voice signals to/from a base station 300 via the antenna. The transmitting/receiving unit 102 is also configured to perform packet-based communications with the base station 300.

The voice input/output unit 103 includes a microphone, a speaker, and a voice-processing circuit. A voice signal inputted via the microphone into the voice input/output unit 103 is transmitted to the base station 300 by the transmitting/receiving unit 102, while a voice signal received by the transmitting/receiving unit 102 from the base station 300 is outputted as a voice through the speaker.

The wireless communication unit 104 complies with Wi-Fi (registered trademark) technology (IEEE 802.11a/802.11b standards). The wireless communication unit 104 wirelessly connects to the communication network 500 (e.g., a local area network ("LAN") or the Internet), via the wireless LAN router 400.

The wireless communication standard for the wireless communication unit 104 is not limited to Wi-Fi, but may include any communication standard that enables the smartphone 100 to wirelessly connect to the communication network 500. For example, the smartphone 100 may be configured to connect wirelessly to the communication network 500 in compliance with Bluetooth (registered trademark) technology (IEEE 802.15.1 standard) or infrared wireless optical data communications (IrDA).

In the illustrative embodiment, the smartphone 100 is connected wirelessly to the communication network 500. In some embodiments, the smartphone 100 may be connected to the communication network 500 by a cable.

The display 105 includes a display device, and a drive circuit configured to drive the display device. Examples of the display device may include a liquid crystal display and an organic EL display.

The operation unit 106 includes a generally transparent touch screen that covers a display surface of the display device, a control circuit configured to control the touch screen, and various operating buttons. By operating the operation unit 106, a user can input telephone numbers and operate application programs.

The imaging unit 107 includes an area image sensor, an optical system, an analog front-end unit, and an image processor. The imaging unit 107 is configured to capture and generate a digital image of an object.

The storage 108 includes a nonvolatile memory, e.g., a flash memory, and stores various programs and data. For example, the storage 108 stores an operating system (OS), the image processing program (described in detail below), other various application programs (hereinafter simply referred to as "applications"), and data.

Applications, such as the image processing program, can be downloaded from an external server, via the transmitting/receiving unit 102 or wireless communication unit 104. The smartphone 100 may be provided with a universal serial bus ("USB") interface and may download applications from an external computer via the USB interface.

The image processing program is an application program for controlling multiple functions (e.g., a printer function, a scanner function, and a facsimile function) of the device 200. The image processing program functions as a device driver for causing the smartphone 100 to control a printer to print an image; to control a scanner to scan an image; and to control a facsimile device to execute facsimile transmission and reception.

Upon installation of the image processing program in the smartphone 100, an application folder and an application setting folder are created in the storage 108.

The application folder is configured to store therein workflow ("WF") information to be used in the image processing program, and device identification information for identifying a device selected by the image processing program as a currently-selected device that executes image processing. The WF is a function that allows a user to register one or more routine tasks. The user may perform a one-touch operation for his/her registered routine task. The user may store, in the application folder, a file created by an extremal computer and written in a particular format, as WF information. Alternatively, WF information created when a WF creating process is executed based on the image processing program, may be automatically stored in the application folder.

The application setting folder is a storage area in which, for example, an administrator, is allowed to store condition information that identifies a device(s) for listing the device information of the device(s) in a device list in an emphasized manner. The condition information is stored in the application setting folder as device designation information. Examples of conditions may include a model name and a location of a device to be listed in the device list in an emphasized manner. The condition information is written in a file in a predetermined format. The file is stored in the application setting folder.

Referring to FIGS. 2A-8, characteristic features or aspects of the image processing program to be executed by the smartphone 100 will be described in detail below.

Figure 3:
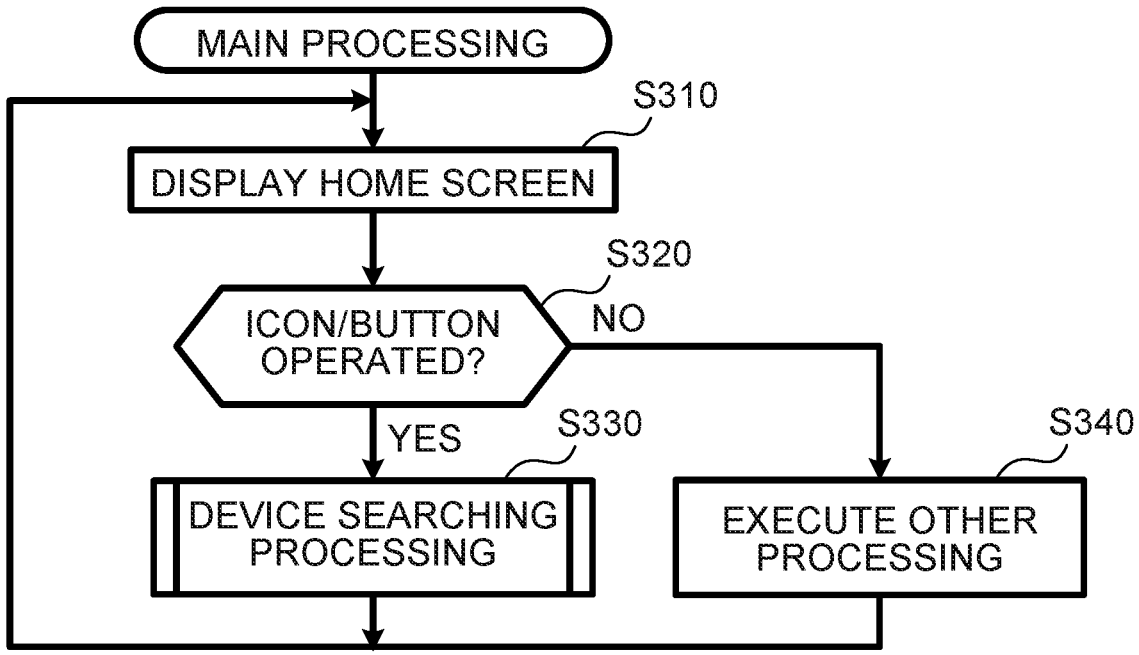
FIG. 3 is a flowchart of main processing of the image processing program to be executed by a controller of the smartphone of FIG. 1, in an illustrative embodiment according to aspects of the disclosure.

Starting the image processing program may cause the CPU of the controller 101 to execute main processing (as depicted in FIG. 3). The CPU of the controller 101 may be simply referred to the "CPU" in the following description.

Figure 2A:
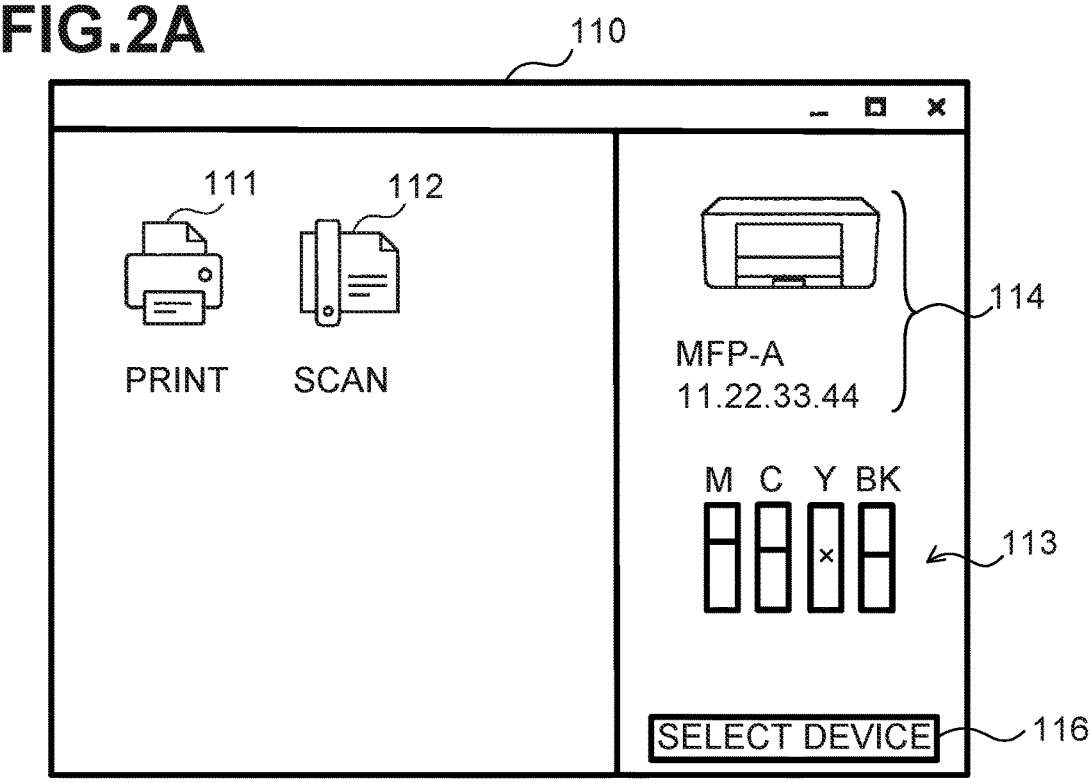
FIG. 2A illustrates an example of a home screen displayed by an image processing program in an illustrative embodiment according to aspects of the disclosure.

In the main processing, the CPU may cause the display 105 of the smartphone 100 to display a home screen 110 as depicted in FIG. 2A (S310 in which "S" denotes a "step"). The home screen, as depicted in FIG. 2A, may show a print icon 111 for allowing a user to select a print function, and a scan icon 112 for allowing a user to select a scan function. The home screen 110 may indicate currently-selected device information 114. In an example shown in FIG. 2A, the currently-selected device information 114 includes an icon representing the MFP 200a, a character string representing a model name ("MFP-A"), and a character string representing an IP address ("11.22.33.44"). Below the currently-selected device information 114, a current status 113 of the device identified by the currently-selected device information is shown.

When the image processing program is first started since the program has been installed, a message may be displayed that indicates no device is selected. Once a device is selected, device information of a device that was last selected may be displayed as the currently-selected device information 114, when the image processing program is started next time.

The currently-selected device information 114 may be read from the application folder in the storage 108. The home screen 110 may display a "select device" button 116 for changing the currently-selected device to another device.

Based on a user's operation of any one of the print icon 111, the scan icon 112, and the "select device" button 116 via the operation unit 106 (S320), the CPU may execute processing associated with the selected icon/button. Based on determining at S320 that the "select device" button 116 is operated or selected, the CPU may start device searching processing for searching for device(s) that is/are on the same network as the smartphone 100 (S330). The device searching processing will be described in detail below.

Based on determining that a device is selected by the user from a list of device(s) searched by the device searching processing, the CPU may return to S310 in which the CPU may cause the display 105 to display an updated home screen showing the currently-selected device information 114 and the status 113 of the selected device.

Based on determining at S320 that the print icon 111 or the scan icon 112 is operated or selected, the CPU may execute processing associated with the selected icon (S340). After executing S340, the CPU may return to S310 in which the home screen is displayed.

For example, if the print icon 111 is selected, such a screen may be displayed that allows the user to select a file to be printed and to define print settings. If the user provides a print instruction, the CPU may send the print instruction for printing the selected file based on the defined print settings, to the currently-selected device, which is represented by the currently-selected device information 114 displayed in the display 105.

If the scan icon 112 is selected, such a screen may be displayed that allows the user to define scan settings. If the user provides a scan instruction, the CPU may send the scan start instruction and a request for transmitting scanned data, to the currently-selected device, which is represented by the currently-selected device information 114 displayed in the display 105. The home screen 110 may display a WF icon for allowing the user to select or designate WF information registered in the application folder. For example, if the currently-selected device matches or corresponds to a device registered in the WF information, the home screen 110 may display the WF icon. Based on a user's operation of the WF icon, the CPU may execute image processing in accordance with the WF information corresponding to the operated/selected WF icon.

Startup of the image processing program may cause the CPU to start priority device list generating processing concurrently with the main processing as depicted in FIG. 3. Referring to FIGS. 4-7, the priority device list generating processing will now be described.

The CPU may determine whether a priority device list is stored in the storage 108 (S1). The priority device list lists information on devices, for allowing a particular device to be searched quickly and for arranging the order of searched devices in a device list 121 (in FIG. 2B). The following information A and B may be included in the priority device list.

Information A: Device identification information that uniquely identifies a device and allows access to the device by unicast Examples of Information A: Internet Protocol address (IP address) assigned to a device, and a node name for a device Information B: Information usable for arranging or changing the displaying order of a device in the device list 121

Examples of Information B: Model name, location name, and serial number of a device When the image processing program is first activated or started since it has been installed in the smartphone 100, the priority device list has not yet been created. Based on determining at S1 that a priority device list is not stored in the storage 108, the CPU may create a blank priority device list (S2). Based on determining at S1 that a priority device list is stored, the CPU may read the priority device list (S3) and temporarily store the priority device list in the RAM of the controller 101.

Subsequently, the CPU may determine whether the device designation information is stored in the application setting folder (S4). Based on determining at S4 that the device designation information is stored in the application setting folder, the CPU may read the device designation information (S5). The CPU may determine whether the read device designation information is included in the priority device list (S6). In other words, the device designation information has already been written in the priority device list.

Based on determining at S6 that the device designation information has not yet been written in the priority device list, the CPU may add or write the device designation information into the priority device list (S7). The CPU may set a priority device list storage flag to "1" (S8) and then proceed to S9 in FIG. 5. The priority device list storage flag indicates whether the priority device list is to be stored or saved. Storing/saving the priority device list may include updating and storing/saving the priority device list.

Based on determining at S6 that the device designation information has already been written in the priority device list, the CPU may skip S7 and S8, and proceed to S9.

Based on determining at S4 that no device designation information is stored in the application setting folder, the CPU may proceed to S9.

At S9, the CPU may determine whether device identification information of a device that had been selected previously is included in the application folder. Based on determining, at S9, that device identification information of the device that had been selected previously is included in the application folder, the CPU may read the device identification information of the device (S10). The device identification information read at S10 is the information (e.g., an IP address or a node name) that uniquely identifies the device on the network. In some embodiments, other information (e.g., a model name) may be additionally read at S10 for use in a subsequent step S12 (e.g., to add the information to the priority device list). The CPU may determine whether the read device identification information is all included in the priority device list (S11). In other words, the CPU may determine whether all device identification information has already been written in the priority device list.

Based on determining at S11 that device identification information of any one or more of the device(s) has not yet been written in the priority device list, the CPU may add or write the device identification information of the one or more device(s) into the priority device list (S12). The CPU may set the priority device list storage flag to "1" (S13), and proceed to S14.

Based on determining at S11 that device identification information of all device(s) has already been written in the priority device list, the CPU may skip S12 and S13, and proceed to S14.

Based on determining at S9 that no device identification information of a device that had been selected previously is stored in the application folder, the CPU may proceed to S14.

At S14, the CPU may determine whether WF information is stored in the application folder. Based on determining at S14 that WF information is stored in the application folder, the CPU may read the WF information (S15). The CPU may determine whether the device identification information, of one or more devices, included in the read WF information is all included (e.g., has already been written) in the priority device list (S16).

Based on determining at S16 that device identification information of any one or more device(s) has not yet been written in the priority device list, the CPU may add or write the device identification information of the one or more device(s), into the priority device list (S17), and set the priority device list storage flag to "1" (S18). Subsequently, the CPU may proceed to S19. The information read from the application folder and written in the priority device list may include information other than the device identification information.

Based on determining at S16 that the device identification information of all device(s) has already been written in the priority device list, the CPU may skip S17 and S18 and proceed to S19.

Based on determining at S14 that no WF information is stored in the application folder, the CPU may proceed to S19.

At S19, the CPU may determine whether the priority device list storage flag is set to "1".

Based on determining at S19 that the priority device list storage flag is set to "1", the CPU may store the priority device list, or update and store the priority device list (S20). Subsequently, the CPU may end the priority device list generating processing. The CPU may store (e.g., update and store) the priority device list in the storage 108 in case information in the application setting folder or the application folder should be deleted.

Based on determining at S19 that the priority device list storage flag is reset to "0", the CPU may end the priority device list generating processing.

At S4, the CPU may determine whether the device designation information is stored in the application setting folder. In contrast, at S9 and S14, the CPU may determine whether information (e.g., the device identification information of a device that had been selected previously, and the WF information) is stored in the application folder. Since information is stored in different folders according to types of information, the CPU may check different folders for different types of information. In other words, the device designation information may not be stored in the application folder, and the device identification information of a device that had been selected previously or the WF information may not be stored in the application setting folder. If Information A and B are stored in a particular folder other than the application setting folder and the application folder, Information A and B need to be searched in the particular folder.

Each of Information A and B may be readily obtained from the device designation information stored in the application setting folder or the device identification information and the WF information stored in the application folder.

Figure 7:
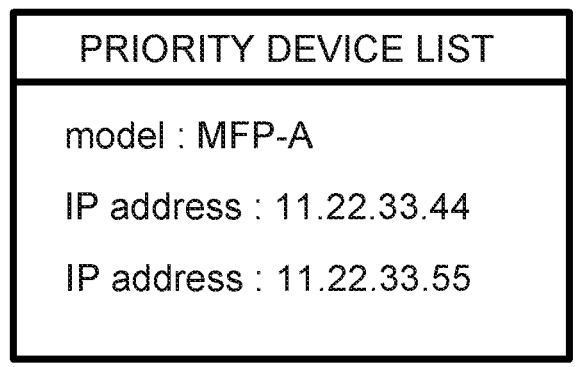
FIG. 7 illustrates an example of a priority device list in an illustrative embodiment according to aspects of the disclosure.

Referring to FIG. 7, a configuration of a priority device list will now be described. The priority device list may be generated in the priority device list generating processing as described referring to FIGS. 3-6.

It is assumed that necessary information for generating a priority device list as depicted in FIG. 7 is prestored in the application setting folder and the application folder. In the illustrative embodiment, an administrator has stored, in the application setting folder, a file in which a model name (e.g., MFP-A) of a particular device is written as device designation information.

The image processing program had selected the MFP 200a previously. The image processing program can execute a WF for causing the printer 200c to print data obtained from a particular server at a predetermined timing. The WF information for executing the WF is stored in the application folder. In other words, the application folder has stored therein device identification information, e.g., the IP address (11.22.33.44) of the device (e.g., the MFP 200a) that had been selected previously as a device that executes image processing, and device identification information, e.g., an IP address (11.22.33.55), of a device (e.g., the printer 200c) included in the WF information.

Execution of the priority device list generating processing may generate a priority device list including the model name (e.g., MFP-A) stored in the application setting folder and the IP addresses of the devices 200a and 200c stored in the application folder. The model name corresponds to Information B and the IP addresses correspond to Information A.

In the illustrative embodiment, the application setting folder stores the condition information, which corresponds to Information B, as device designation information. In some embodiments, the application setting folder may store an IP address and other information corresponding to Information A. If the application setting folder stores only the information corresponding to Information A, the priority device list may not include information corresponding to Information B.

Referring to FIG. 8, the device searching processing, which is executed at S330 in the main processing in FIG. 3, will now be described in detail below.

Figure 4:
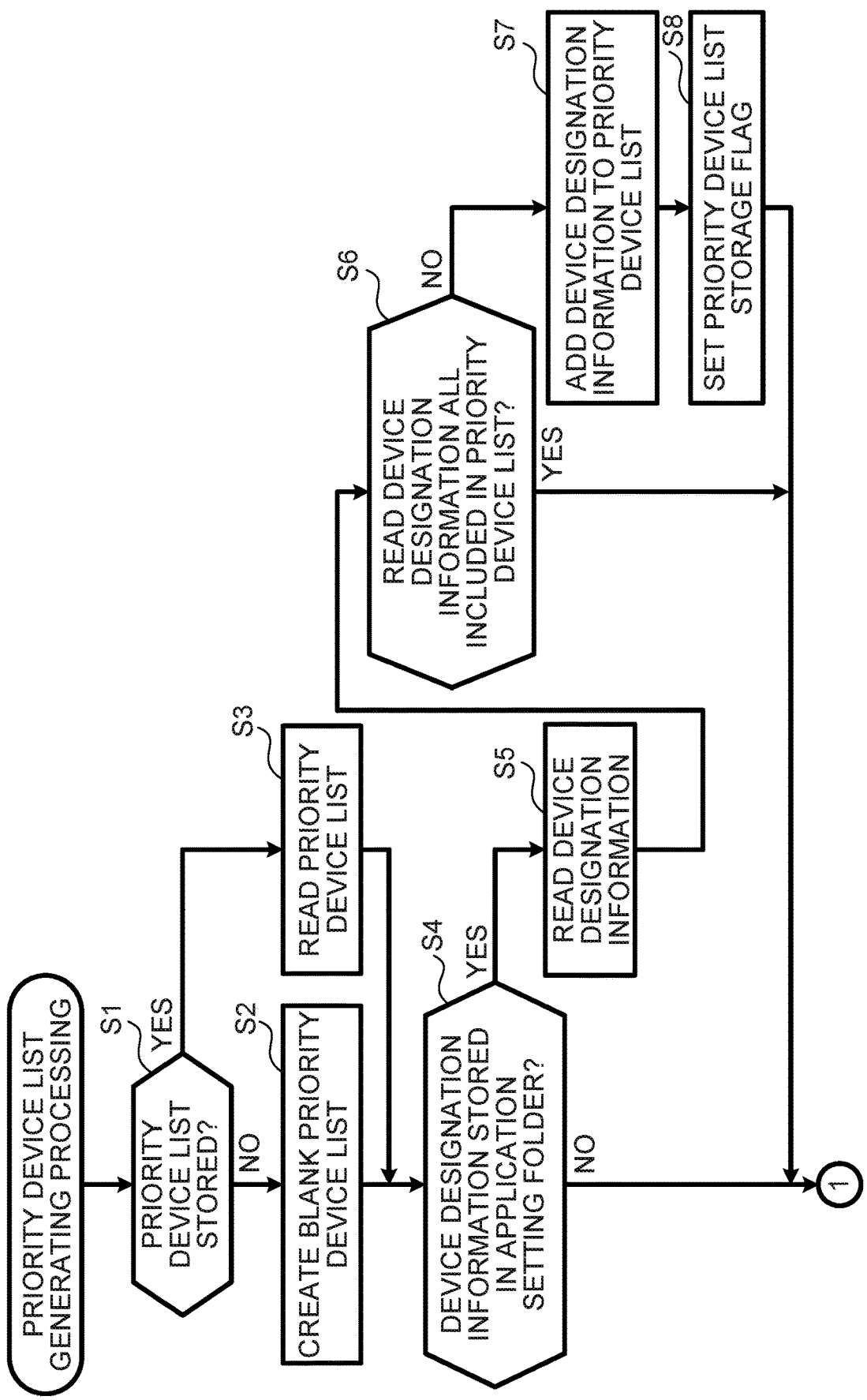
FIG. 4 is a flowchart illustrating a part of priority device list generating processing to be executed by the controller of the smartphone of FIG. 1, in an illustrative embodiment according to aspects of the disclosure.
Figure 5:
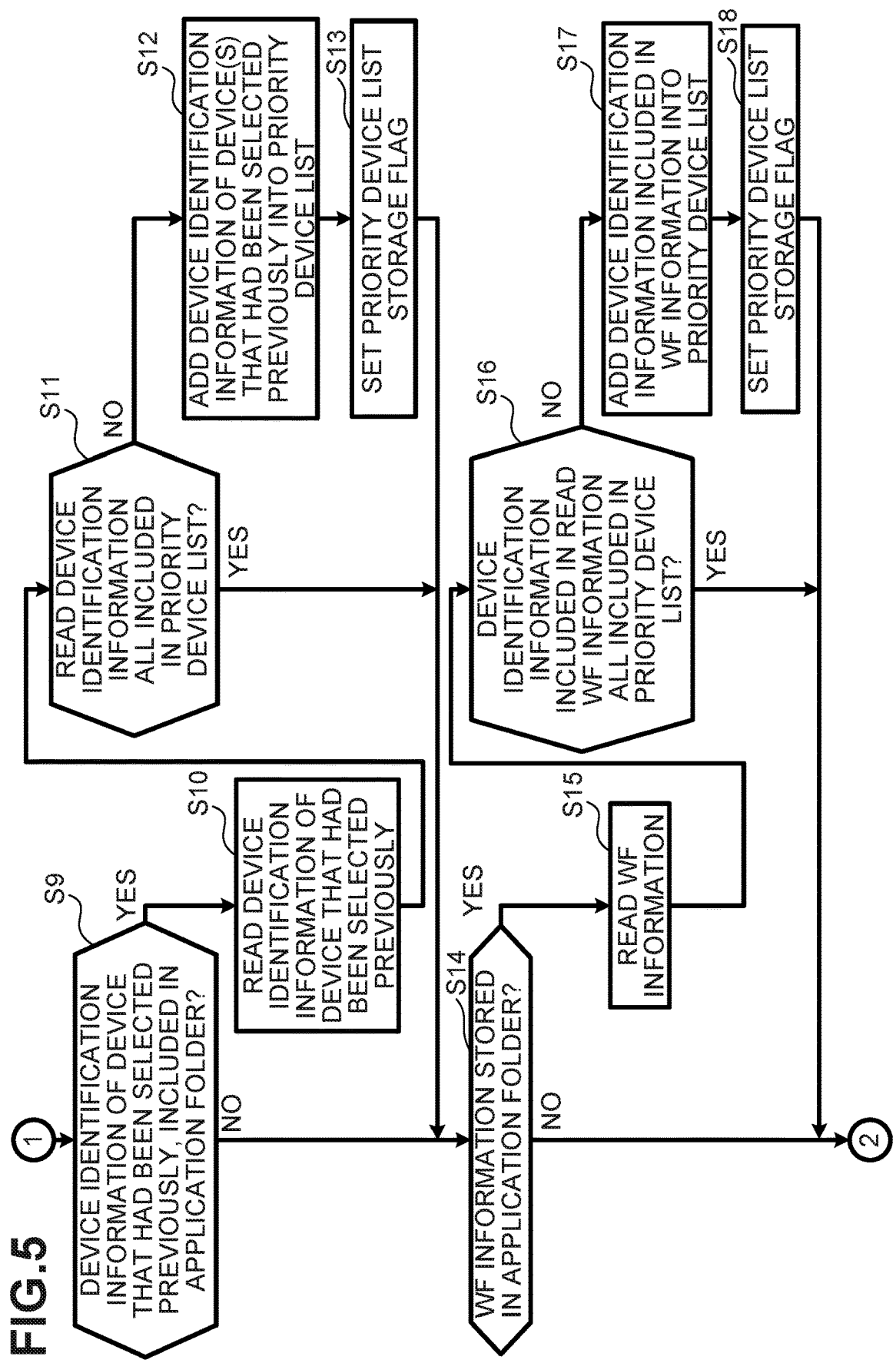
FIG. 5 is a flowchart illustrating another part of the priority device list generating processing to be executed by the controller of the smartphone of FIG. 1, in an illustrative embodiment according to aspects of the disclosure.
Figure 6:
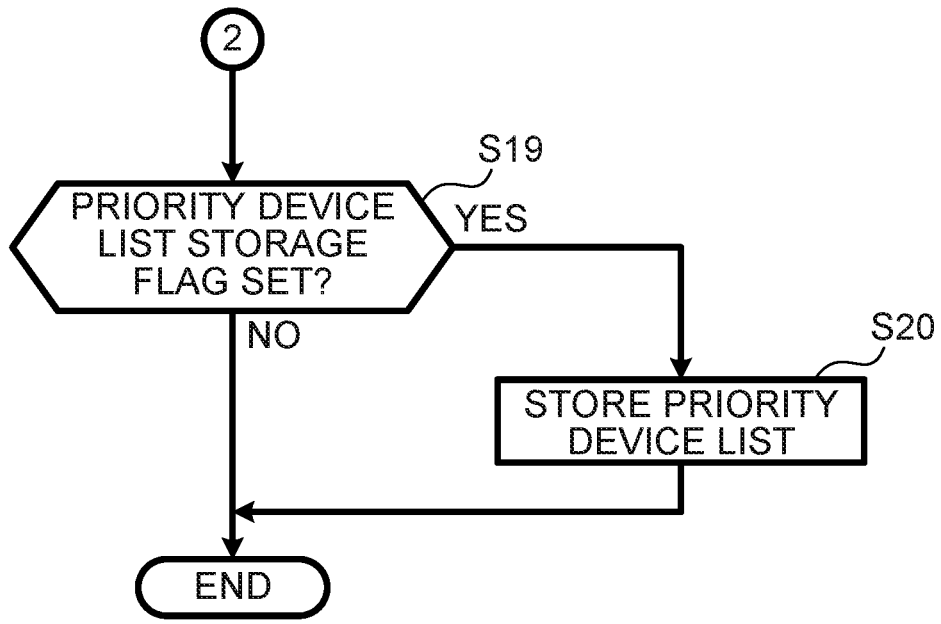
FIG. 6 is a flowchart illustrating the other part of the priority device list generating processing to be executed by the controller of the smartphone of FIG. 1, in an illustrative embodiment according to aspects of the disclosure.

Starting the device searching processing may cause the CPU to determine whether a priority device list is stored in the storage 108 (S31), similar to S1 in FIG. 4. Based on determining at S31 that a priority device list is not stored, the CPU may search for devices by broadcast (S32) and proceed to S41.

Figure 2B:
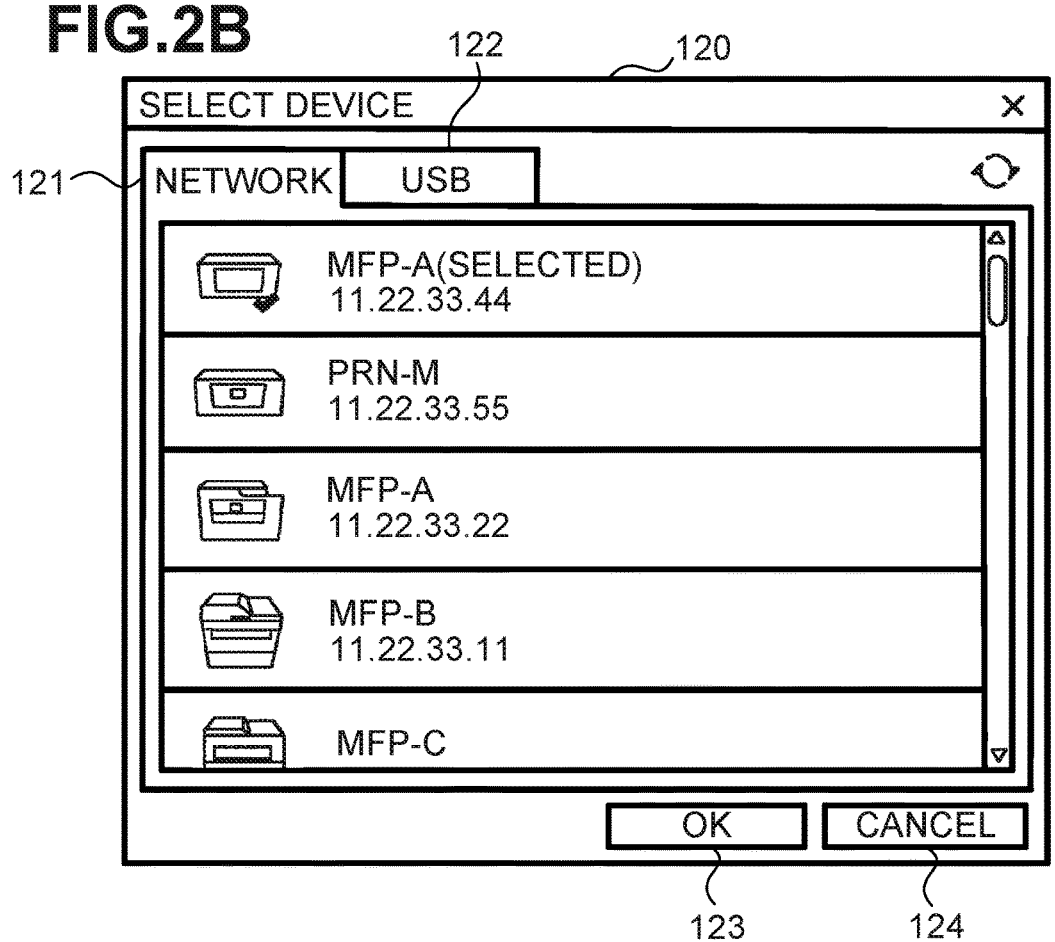
FIG. 2B illustrates an example of a searched device dialog box in an illustrative embodiment according to aspects of the disclosure.

At S41, the CPU may cause the display 105 to display search results obtained by broadcasting in a list format. The search results may be displayed in the device list 121 as depicted in FIG. 2B. The device list may list device information of devices sequentially from the top in the order that a user is likely to select. As the CPU proceeds to S41 subsequent to S32, the device information of devices in the device list may not be sorted or ordered but be listed in the order of receiving responses to the broadcasted request from the devices. The device information to be displayed in the device list 121 includes information included in the response. In one example, the device information may include, but not limited to, an icon representing a device, and a model name and an IP address of the device. The device information may preferably include information that readily identifies a device for user selection of the device from the device list 121.

Based on determining at S31 that a priority device list is stored in the storage 108, the CPU may read the priority device list (S33), similar to S3 in FIG. 4. Subsequently, the CPU may proceed to S34.

At S34, the CPU may determine whether the priority device list includes information that uniquely identifies a device, e.g., Information A (e.g., an IP address or a node name). Based on determining at S34 that the priority device list includes information that uniquely identifies a device, the CPU may send a request by unicast to the device using the information (S35). If the priority device list includes pieces of information that uniquely identify devices, the CPU may send a request to the devices using the pieces of information.

The CPU may determine whether the CPU has received, from the device, a response to the unicasted request (the request sent by unicast) (S36). Based on determining at S36 that the CPU has received a response from the device, the CPU may cause the display 105 to display a search result, e.g., device information of the device searched by unicast (S37). If a request is sent by unicast to a plurality of devices, the CPU may determine whether the CPU has received responses from the devices. The CPU may cause the display 105 to display the device list 121 listing device information of devices in the order that the CPU has received responses from the devices. Subsequently, the CPU may proceed to S38. Based on determining at S36 that the CPU has not received any response from a device, the CPU may skip S37 and proceed to S38.

Based on determining at S34 that the priority device list does not include information that uniquely identifies a device, the CPU may proceed to S38.

At S38, the CPU may search for devices by broadcast, similar to S32. The CPU may wait for responses from the devices on the network. After waiting for a predetermined period of time, the CPU may proceed to S39. Device information of device(s) that has/have responded to the request sent by broadcast is listed in the device list below a search result of the device(s) searched by unicast. The device that has transmitted a response responsive to the unicasted request at S35, may also transmit a response responsive to the broadcasted request (the request sent by broadcast) at S38. In this case, the device list would list the same device information twice. If the CPU receives a response from a particular device corresponding to the device information that has already been listed in the device list, the CPU may not list, in the device list, the device information of the particular device that has responded to the broadcasted request (e.g., the device that has transmitted a response responsive to the broadcasted request).

At S39, the CPU may determine whether the priority device list includes sorting information (e.g., Information B) for sorting search results of the devices searched by broadcast. Based on determining at S39 that the priority device list includes the sorting information, the CPU may list, in the device list, device(s) corresponding to the sorting information on top of the search results of the devices searched by broadcast (S40). Subsequently, the CPU may proceed to S41.

The priority device list may include information, such as Information B, that can be used for sorting or changing the listing order in the device list. At S39, the CPU may determine whether the priority device list includes Information B. The search results of devices searched by broadcast can be sorted based on Information B.

The sorting at S40 may be performed for devices searched by broadcast and may not be performed for device(s) searched by unicast (e.g., devices responded to the unicasted request) at S35 through S37. Device information of device (s) responded to the unicasted request is listed at the top of the device list 121, as an emphasized manner. The device responded to the unicasted request deems to be a device most likely to be selected by a user. If multiple devices are searched by unicast, the devices may be sorted. Preferably, device(s) searched by unicast may be sorted separately from the device(s) searched by broadcast, and may be emphasized in the device list 121 over the device(s) searched by broadcast.

Based on determining at S39 that the priority device list does not include sorting information, the CPU may skip S40 and proceed to S41 where the CPU may cause the display 105 to display search results, e.g., device information of the devices searched by broadcast, without sorting. Accordingly, the device list 121 may list device information of devices in the order in which the CPU has received responses from the devices.

A user's selection of a device from the device list 121 may cause the CPU to determine the device as a currently-selected device (S42). Subsequently, the CPU may end the device searching processing.

Execution of the device searching processing may cause the display 105 to display a searched device dialog box 120 as depicted in FIG. 2B. In FIG. 2B, the searched device dialog box 120 displays the device list 121 with a tab labelled "network" and another device list 122 with a tab labelled "USB". The tabs may allow a user to select and display one of the device list 121 and 122. In the illustrative embodiment, USB connected devices are not searched but devices on a communication network are, so that the dialog box 120 may display the device list 121 with a tab labelled "network". The device list 121 described above has a tab labelled "network".

The device list 121 in the searched device dialog box 120 may list the MFP 200*a*, the printer 200*c*, the MFP 200*b*, and the MFP 200*e* in this order from the top. The MFPs 200*a* and the printer 200*c* are searched by unicast. The devices listed below the MFP 200*b* are searched by broadcast. The MFP 200*b* listed on the top of the devices searched by broadcast has the model name "MFP-A", which corresponds to the model name registered in the priority device list. Accordingly, the MFP 200*b* may be emphasized or prioritized in the device list 121 over the other devices searched by broadcast.

In the illustrative embodiment, using Information B (e.g., a model name), the listing of the devices in the device list 121 may be arranged such that the device with the model name may be listed at an upper portion of the device list 121. Device designation information on a latest model may be stored in the application setting folder to list a device with the latest model at an upper portion of the list. This may allow a user to readily select the latest mode from the device list 121.

The device designation information may include various information, e.g., a device category (e.g., inkjet models, laser models, and document scanner models); functions (e.g., a print function and a scan function); a print/scan speed; and availability (e.g., ink installation and sheet setting).

A user may select any one of devices (e.g., device information) from the device list 121, and may tap on an "OK" button 123, thereby determining the selected device as a currently-selected device that executes image processing (S42). The device information (including device identification information) of the currently-selected device may be stored in the application folder. An icon representing the currently-selected device, and the currently-selected device information 114 may be displayed on the home screen 110.

According to aspects of the disclosure, the display may display a device list listing device information of a particular device in an emphasized manner. This may allow a user to readily select the particular device from the device list, which may list a plurality of devices.

The smartphone 100 is an example of a "terminal device" as claimed. The communication network 500 is an example of a "network" as claimed.

According to aspects of the disclosure, a particular device may be searched by unicast, so that the particular device can be listed in the device list. Device information of a device searched twice may be listed once in the device list, so that the device information may not be redundantly listed in the device list.

The application folder includes all information to be displayed in the device list for the devices, but devices are searched by unicast. This is because the devices may not always be connected to the network when the device list is displayed. Such a situation may be prevented or reduced that a device that is not connected to the network would be listed in the device list and a user would select the device from the device list 121. In some embodiments, a device that is not connected to the network may be listed in the device list 121 with a note stating that a response from the device has not been received.

According to aspects of the disclosure, device information of devices may be listed in the device list in the order that the CPU has received responses from the devices. This may enable the device searched first by unicast to be listed in the device list in an emphasized manner.

According to aspects of the disclosure, device information of a device that had been selected previously may be listed in the device list in an emphasized manner.

According to aspects of the disclosure, device information of a device required for executing a WF function may be listed in the device list in an emphasized manner.

According to aspects of the disclosure, the storage may store particular information, e.g., condition information. A device that satisfies the condition information may be listed in the device list in an emphasized manner. For example, a name of a model that a system administrator wants users to use primarily or frequently may be stored in the storage as condition information. A user, who wants to use a printer that is ready to print, may store, in the storage, condition information that identifies a device having a "ready-to-print" status. This may allow a printer that is ready to print to be listed in an emphasized manner in the device list displayed in the display.

Devices listed in the priority device list may be searched by unicast. This may reduce search time.

While aspects are described in detail with reference to the specific embodiment thereof, this is merely an example, and various changes, arrangements and modifications may be made therein without departing from the spirit and scope of the disclosure.

(1) In the illustrative embodiment, the CPU obtains Information A stored by the application program in the storage 108. In some embodiments, the CPU may obtain Information A from, for example, a printer queue created when a printer driver is installed or from information stored in the registry. If a server manages locations of devices connected to a communication network, information of device(s) located closer to the smartphone 100 may be obtained from the server.

(2) In the illustrative embodiment, the CPU searches for the devices 200*a*-200*f* on the communication network 500 and obtains information on the devices 200*a*-200*f*. In some embodiments, the CPU may search for USB connected devices and obtain information on the USB connected devices. Aspects of the disclosure may be applied to network connected devices, as well as USB connected devices. Information A for a USB connected device may include, for example, a serial number of the device. Information B for the USB connected device may include, for example, a vendor ID and a product ID. The information A and B may be obtained, for example, through an OS. With the method described above in the illustrative embodiment, the display may display a device list in which device information of a particular device is prioritized or emphasized over device information of other devices.

(3) In the illustrative embodiment, a particular device may be listed in the device list 121 in an emphasized manner with respect to the listing position (e.g., listing the particular device above the other devices). Alternatively, the particular device may be listed in the device list 121 in an emphasized manner by formatting or adjusting the text representing the particular device, for example, with respect to color, text decoration, and font. Further, a user may select an emphasizing manner from multiple manners.

(4) In the illustrative embodiment, examples of Information B include a model name, a location name, and a serial number of a device. Another example of Information B may be information as to whether a device driver has been installed. The information may be directly obtained from the device driver. Information B may be obtained from the capability or status of a device.

(5) In the illustrative embodiment, the terminal device is the smartphone 100. In another embodiment, the terminal device may be a tablet device, a personal computer ("PC"), or a personal digital assistant ("PDA").

What is claimed is:

1. A non-transitory computer-readable storage medium storing a program for a terminal device configured to connect to a network, and image processing devices, including a particular image processing device, that are on the network, the image processing devices, each having device identification information that uniquely identifies a respective one of the image processing devices, the terminal device comprising:
   a storage configured to store the device identification information of the particular image processing device which is to be listed in a device list in an emphasized manner;
   an operation unit configured to receive an input from a user of the terminal device;
   a display; and
   a controller;
   wherein the program, when executed by the controller, causes the terminal device to perform:
   based on receiving the input from the user via the operation unit, sending a signal to the image processing devices, including the particular image processing device, that are on the network, to search for the image processing devices, wherein the sending the signal includes sending the signal, based on the device identification information stored in the storage, to the particular image processing device by unicast to search for the particular image processing device, and to the image processing devices including the particular image processing device, by broadcast to search for the image processing devices;
   receiving responses to the signal from the image processing devices, wherein the receiving the responses includes receiving, from the particular image processing device, a response to the signal sent by unicast and a response to the signal sent by broadcast; and
   based on receiving a response to the signal from the particular image processing device that is identified by the device identification information stored in the storage, displaying, in the display, the device list listing device information of the particular image processing device in the emphasized manner, wherein the device information of the particular image processing device searched twice is listed once in the device list,
   wherein an image processing device searched by unicast is emphasized in the device list over an image processing device searched by broadcast.

2. The storage medium according to claim 1, wherein the displaying includes, based on receiving the responses to the signal from the image processing devices, displaying the device list listing device information of the image processing devices, and
   wherein the emphasized manner includes placing the device information of the particular image processing device on top of the device list.

3. The storage medium according to claim 1, wherein the sending the signal includes sending the signal first to the particular image processing device by unicast, and then to the image processing devices including the particular image processing device, by broadcast, and
   wherein the displaying includes displaying, in the display, the device list listing the device information of the image processing devices based on an order of receiving the responses from the image processing devices.

4. The storage medium according to claim 1, wherein the program, when executed by the controller, causes the terminal device to further perform:
   receiving a user's selection of one image processing device from the device list; and
   storing, in the storage, the device identification information of the one image processing device as the device identification information of the particular image processing device.

5. The storage medium according to claim 1, wherein the program, when executed by the controller, causes the terminal device to further perform:
   receiving a user's instruction to store, in the storage, an image processing parameter in association with one image processing device; and
   storing, in the storage, the device identification information of the one image processing device as the device identification information of the particular image processing device.

6. The storage medium according to claim 1, wherein the program, when executed by the controller, causes the terminal device to further perform:
   receiving a user's instruction to store, in the storage, particular information that identifies one image processing device; and
   based on receiving a response to the signal from the one image processing device, displaying, in the display, the device list listing device information of the one image processing device as the particular image processing device.

7. The storage medium according to claim 1, wherein the program, when executed by the controller, causes the terminal device to further perform:
   generating a priority device list listing the particular image processing device whose device identification information is stored in the storage,
   wherein the sending the signal includes sending the signal by unicast to the particular image processing device listed in the priority device list.

8. A terminal device, comprising:
   a storage configured to store device identification information of a particular image processing device which is to be listed in a device list in an emphasized manner;
   a display;
   a network interface configured to connect the terminal device to a network, and to image processing devices, including the particular image processing device, that are on the network, the image processing devices, each having device identification information that uniquely identifies a respective one of the image processing devices; and
   a controller configured to:
   send a signal to the image processing devices, including the particular image processing device, that are on the network, to search for the image processing devices, wherein the sending the signal includes sending the signal, based on the device identification information stored in the storage, to the particular image processing device by unicast to search for the particular image processing device, and to the image processing devices including the particular image processing device, by broadcast to search for the image processing devices;
   receive responses to the signal from the image processing devices, wherein the receiving the responses includes receiving, from the particular image processing device, a response to the signal sent by unicast and a response to the signal sent by broadcast; and based on receiving a response to the signal from the particular image processing device that is identified by the device identification information stored in the storage, display, in the display, the device list listing device information of the particular image processing device in the emphasized manner, wherein the device information of the particular image processing device searched twice is listed once in the device list, wherein an image processing device searched by unicast is emphasized in the device list over an image processing device searched by broadcast.

\* \* \* \* \*